R. STEPHENS.
DRUM BRAKE WITH INTERNAL SHOES.
APPLICATION FILED JAN. 23, 1918.
1,327,068.
Patented Jan. 6, 1920.
2 SHEETS—SHEET 1.
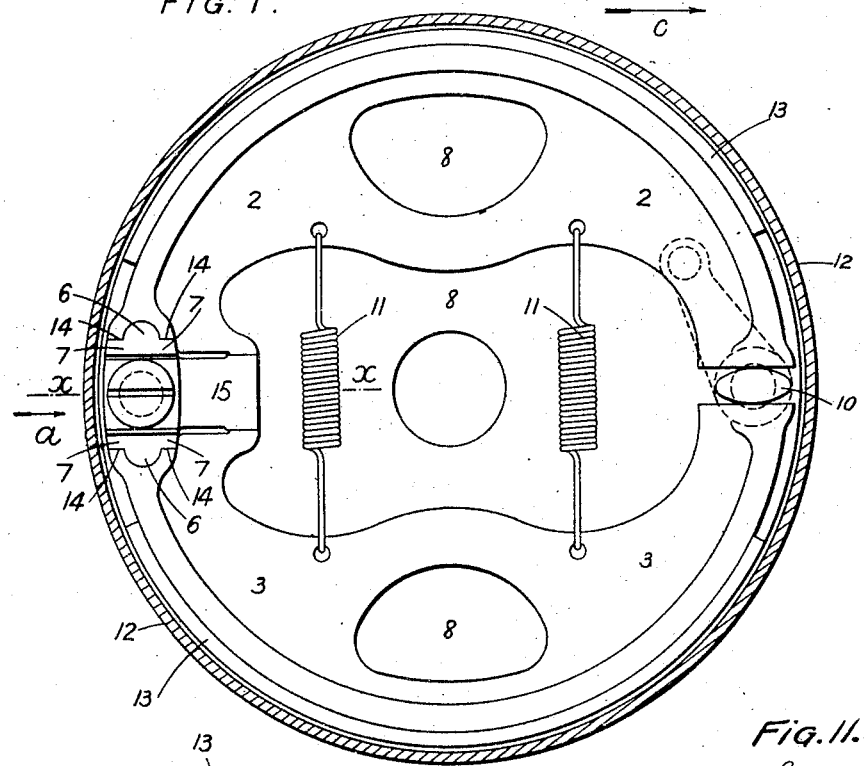
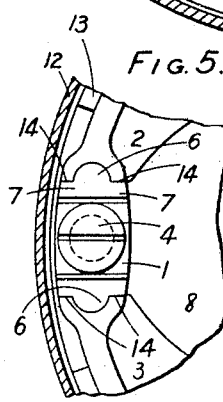
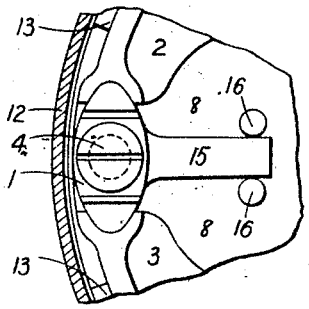
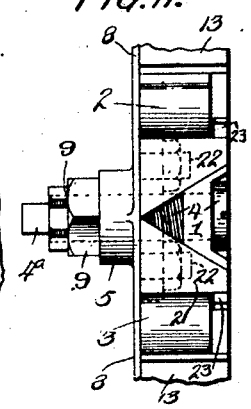
INVENTOR:
Richard Stephens
By Wm Wallace White
ATTY.

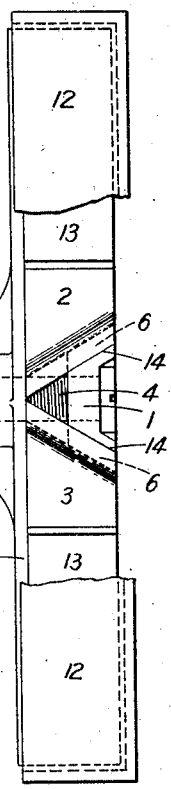
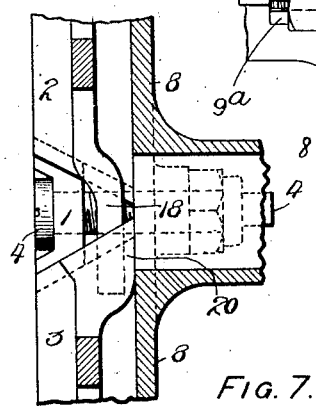
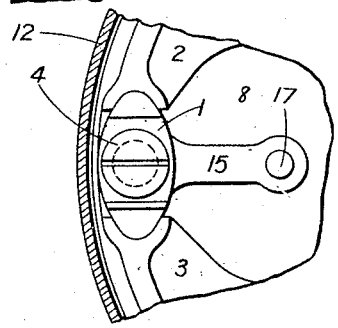
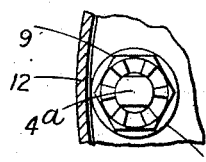
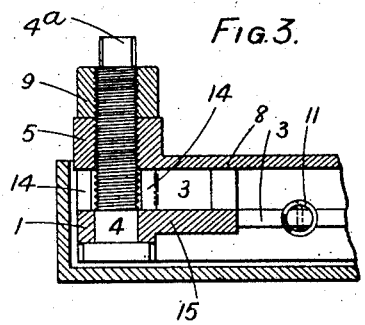
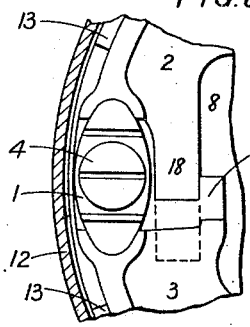
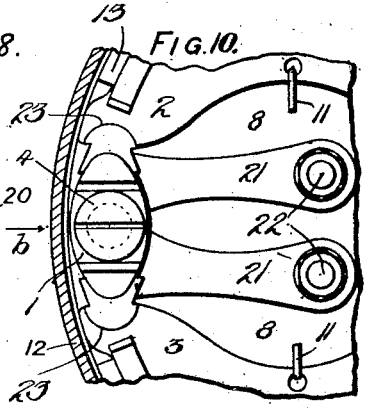

UNITED STATES PATENT OFFICE.

RICHARD STEPHENS, OF CLEVEDON, ENGLAND.

DRUM-BRAKE WITH INTERNAL SHOES.

1,327,068.   Specification of Letters Patent.   Patented Jan. 6, 1920.

Application filed January 23, 1918. Serial No. 213,294.

*To all whom it may concern:*

Be it known that I, RICHARD STEPHENS, of 9 The Triangle, Clevedon, Somerset, England, a subject of the King of Great Britain and Ireland, have invented certain new and useful Improvements in Drum-Brakes with Internal Shoes, of which the following is a specification.

This invention relates to drum brakes of the kind in which braking is effected by means of shoes which are contained within the drum and are adapted to be expanded or opened out, against the resistance of coupling springs, to bear against the drum internally when operated for braking, and more especially to means for adjusting the shoes to compensate for wear thereof and of the drum of the type in which the shoes are moved by wedge action effected through the medium of a screw device, without detaching the wheel or wheels fitted with the brakes.

According to this invention the movement of the brake shoes is effected by a wedge-shaped adjusting block disposed near the periphery of the brake shoes, and adapted to be moved transversely of the casing in which the brake shoes are disposed with means for limiting the movement of the brake shoes relatively to one another.

Referring to the accompanying drawings, Figure 1 is an internal face view, with drum side cut off, of a drum brake constructed in accordance with this invention. Fig. 2 is an edge view as seen looking in the direction indicated by the arrow $a$, Fig. 1. The drum is shown as in part broken away. Fig. 3 is a transverse sectional plan view on the line XX, Fig. 1. Fig. 4 is a rear view of a part of Fig. 3. Fig. 5 is a part face view of a construction in and relating to the adjustment block. Figs. 6, 7, 8 and 9 show another construction. Fig. 9 is a sectional view, partly in elevation, of Fig. 8. Fig. 10 is an internal face view of another construction. Fig. 11 is an edge view of Fig. 10 as seen looking in the direction indicated by the arrow $b$. In Fig. 11 the adjustment block is omitted.

In the arrangement shown in Figs. 1 to 4 inclusive, an adjusting block 1 is interposed between the brake shoes 2 and 3 at those ends thereof which are adjacent to the pin 4 which is passed into the hole in the block. The hole in the block 1 for taking the pin 4 is not screw-threaded. The pin 4 is flattened on two sides at the end $4^a$ for a spanner to fit on, or for gripping by pincers, so that the pin 4 can thereby be turned. Instead of being thus flattened, the end part may be round throughout and have a cross groove or recess provided in it, like that in the pin head, to take the chisel end of a turn-screw.

In first assembling the parts, and before the shoes 2 and 3 are boxed in by the drum 12, the pin 4 is screwed in by means of a turn-screw, applied at the pin head, until the head reaches the block 1 which stands at its maximum height in the gap between the shoes. Subsequent turnings of the pin 4 for adjusting the shoes 2 and 3 are effected from the other end $4^a$ of the pin. The block 1 has tapered ends and has wings, fillets or ribs 6 which are also tapered and are of a partly rounded conformation. The block 1 has also flat-faced flanks 7. The ends of the shoes which receive the block 1 are shaped correspondingly to take the block which is adapted to be slid in the gap in which it is placed between the said ends of the shoes. The pin 4, the underface of the head of which bears on the block 1, is screwed into a fixed member or part of the vehicle, engine, machine or other appliance fitted with the brake. In the accompanying drawings, the said fixed part is the disk 8 of the axle casing in a motor-car or like vehicle with which disk the axle casing is integral. The pin 4 is screwed into the disk 8 and into the boss 5 and is fitted with a nut 9 and lock nut $9^a$.

As is usual in drum brakes which have internal shoes, the shoes are operated, in braking, by means of a cam 10 which is of the usual character and is actuated, as ordinarily, by means of brake rods, levers and connected mechanism. Springs 11, which are of the usual kind, and are expanded as the shoes are spread, return the shoes to the "off" position when the cam 10 is turned for release of brake.

When, owing to the wear of the "linings" or coatings 13 of the shoes 2 and 3 and of the internal face of the flange of the drum 12, adjustments of the shoes are required to be made, in order to insure effective binding action of the brake, such adjustments are made without unfixing the drum 12. The nut 9 is first relaxed and, by means of a spanner or other instrument applied at the end $4^a$ of the pin 4, projecting out beyond the axle casing disk 8, the pin 4 is then turned in the direction for drawing the block 1 toward the disk 8 and the shoes 2 and 3 are accordingly moved apart by the adjusting block 1 to the required extent. The nut 9 is then tightened up against the boss 5.

In the operation of the brake as ordinarily constructed, the action of the operating cam 10 would normally tend to cause one shoe to move bodily in one direction, as for instance, in the direction of the arrow $c$ (Fig. 1), and the other shoe in the opposite direction, whereby one end of each of the shoes would be caused to partially bear against the drum, thereby causing unevenness of wear. For convenience in description, this movement of the shoes is herein termed traversing movement. One of the objects of this invention is to permit the pivotal movement of the shoes about an axis without permitting such traversing movement, and this object is accomplished by all of the modified structures herein illustrated by reason of the fact that the wedge-shaped block 1, about which the shoes have a pivotal movement, is prevented from following such pivotal movement; in other words, is held against yielding to the pressure of the shoe 2 on one side thereof and the pressure of the shoe 3 on the opposite side, which combined pressures, being exerted in opposite directions, would normally tend to turn the block about its center as an axis.

In the construction shown in Figs. 1 to 4 inclusive, the turning of the block is prevented by means of the arm 15, which is integral with the block 1 and extends between the flat web portions of the shoes 2 and 3.

In the construction shown in Fig. 5, the flat faced flanks 7 of the block 1 bearing against the correspondingly shaped faces 14 of the shoes are relied upon to prevent such turning of the block.

In the construction shown in Fig. 6, the block is prevented from turning by the arm 15 which is integral with the block 1 and is restrained from sidewise movement by studs 16 fixed in the axle casing 8.

The arm 15 is slidable toward and from the disk 8. In the construction shown in Fig. 7 the arm 15 of the block 1 is slidable upon but can not turn about the fixed stud 17. In Figs. 8 and 9 is shown another construction for preventing traversing movement of the shoes. In this arrangement the shoe 2 has a tongue 18 which is received into a channel 19 provided at the back of the shoe 3 and bears at one side against a lug 20 which projects rearward from the shoe 3.

In the construction shown in Figs. 10 and 11, the adjusting block 1 does not lie directly on the shoes 2 and 3, but lies between the outer parts of a pair of arms 21 which are pivotal about studs 22 fixed in the disk 8. In making adjustments of the shoes, the block 1 does not press the shoes against the disk 8. The overhanging parts 23 of the arms 21 keep the shoes from moving toward the drum side.

The said arms 21 which are loosely held down by nuts, prevent "traversing" movement of the shoes.

According to another construction the means of adjusting may be a cone loosely carried on the pivot pin.

What I claim and desire to secure by Letters Patent is:—

A brake comprising a drum, shoes within the drum, a wedge interposed between one of the ends of said shoes, and movable transversely thereof, wings formed on said wedge, the aforementioned ends of said shoes being pivotal about said wings, a radially disposed arm integral with said wedge and interposed between the adjacent ends of said shoes, and means at the opposite ends of said shoes for forcing the same apart.

In testimony whereof I have signed my name to this specification.

RICHARD STEPHENS.